United States Patent
Cyrell

[19]

[11] Patent Number: 6,102,350
[45] Date of Patent: *Aug. 15, 2000

[54] APPARATUS FOR MOUNTING OBJECTS, INCLUDING TENSION MEMBER

[75] Inventor: Alexander Cyrell, Paradise Valley, Ariz.

[73] Assignee: OmniMount Systems, Inc., Phoenix, Ariz.

[*] Notice: This patent is subject to a terminal disclaimer.

[21] Appl. No.: 09/055,600

[22] Filed: Apr. 6, 1998

Related U.S. Application Data

[63] Continuation-in-part of application No. 08/579,868, Dec. 28, 1995, Pat. No. 5,927,668.

[51] Int. Cl.$^7$ ........................................................ A47H 1/10
[52] U.S. Cl. .................. 248/317; 24/68 CD; 248/316.1; 248/917; 248/924
[58] Field of Search ...................................... 248/317, 320, 248/323, 328, 326, 489, 917, 924, 274.1, 278.1, 279.1, 551, 316.1, 316.2, 316.4, 316.6; 24/68 CD, 265 AL, 909; 254/231, 232, 233; 52/720.1, 734.1, 656.5, 656.6, 656.9; 269/108, 130, 42, 41, 109, 131, 132, 104; 40/783, 784

[56] References Cited

U.S. PATENT DOCUMENTS

| | | | |
|---|---|---|---|
| 542,966 | 7/1895 | Right | ...................................... 24/909 X |
| 565,916 | 8/1896 | McKee | ................................... 24/909 X |
| 2,204,493 | 6/1940 | Henry . | |
| 2,539,997 | 1/1951 | Graves | ............................. 24/68 CD X |
| 2,608,383 | 8/1952 | Edelblute | ............................. 24/68 CD |
| 2,611,949 | 9/1952 | Wanamaker . | |
| 2,831,808 | 4/1958 | Eseff et al. . | |
| 3,429,602 | 2/1969 | Dirilgen . | |
| 3,451,153 | 6/1969 | Dohanyos . | |
| 3,784,043 | 1/1974 | Presnick . | |
| 3,796,404 | 3/1974 | Shields | ....................................... 410/55 |
| 4,027,866 | 6/1977 | Ruggiero . | |
| 4,031,796 | 6/1977 | Wilkes . | |

(List continued on next page.)

FOREIGN PATENT DOCUMENTS

| | | |
|---|---|---|
| 181133 | 2/1907 | Germany . |
| 457013 | 3/1928 | Germany . |
| 2231995 | 11/1990 | United Kingdom . |

OTHER PUBLICATIONS

Publication entitled "Arc Connections I, Adustable Framing Support Systems from Omnimount "; 1996 Omnimount Systems Inc.

*Primary Examiner*—Ramon O. Ramirez
*Attorney, Agent, or Firm*—Gallagher & Kennedy

[57] ABSTRACT

A mounting system for mounting an object includes a plurality of framing members having a body portion and depending side walls, with at least one continuous slot running along the length of the framing member. The framing member has an inwardly directed and continuous flange running along the length thereof, and the flange and the body portion of the framing member define a groove. A plurality of connecting members for connecting adjacent framing members are provided. A plurality of cornerpieces are provided which each have inner and outer surfaces with a plastic material of high coefficient of friction located at least partially over the inner surface, each corner piece being located, in use, with its outer surface adjacent a corner connection between adjacent framing members and its inner surface with the high coefficient of friction material thereon adapted, in use, to engage the object to be mounted. The framing member and connecting pieces are slidable relative to each other so as to form a frame of desired shape and configuration. The system further comprises at least one cable extending through the framing member and connecting members so as to hold the framing members and connecting members securely and firmly relative to each other. An adjustable tensioning assembly is provided for maintaining a constant holding force of the frame around an object through an adjustment range of the assembly which corresponds to variable length of the cable(s).

38 Claims, 16 Drawing Sheets

U.S. PATENT DOCUMENTS

| | | |
|---|---|---|
| 4,074,811 | 2/1978 | Filak . |
| 4,356,648 | 11/1982 | Beaulieu . |
| 4,450,655 | 5/1984 | Rossenthal et al. . |
| 4,831,804 | 5/1989 | Sayer . |
| 4,924,649 | 5/1990 | Taylor . |
| 4,997,155 | 3/1991 | Reuter et al. . |
| 5,064,161 | 11/1991 | Anderson . |
| 5,161,789 | 11/1992 | Rogers . |
| 5,165,644 | 11/1992 | Allen . |
| 5,310,152 | 5/1994 | O'Neill . |
| 5,400,993 | 3/1995 | Hamilton . |
| 5,402,557 | 4/1995 | Dalen ................................... 24/68 CD |
| 5,411,244 | 5/1995 | Turner . |
| 5,538,214 | 7/1996 | Sinila . |
| 5,927,668 | 7/1999 | Cyrell ................................... 248/317 |

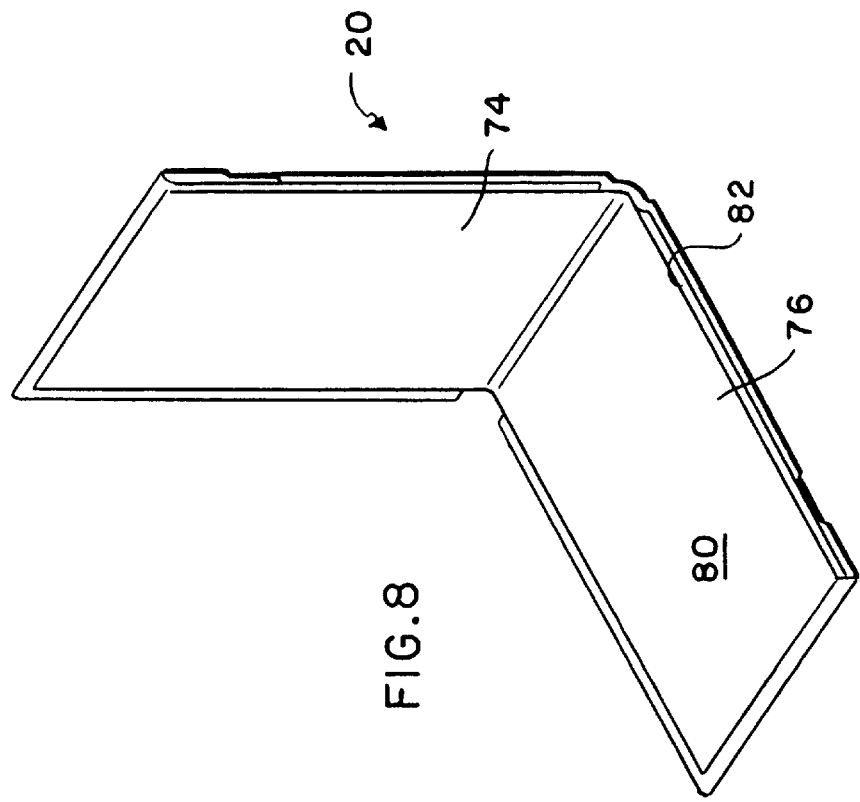
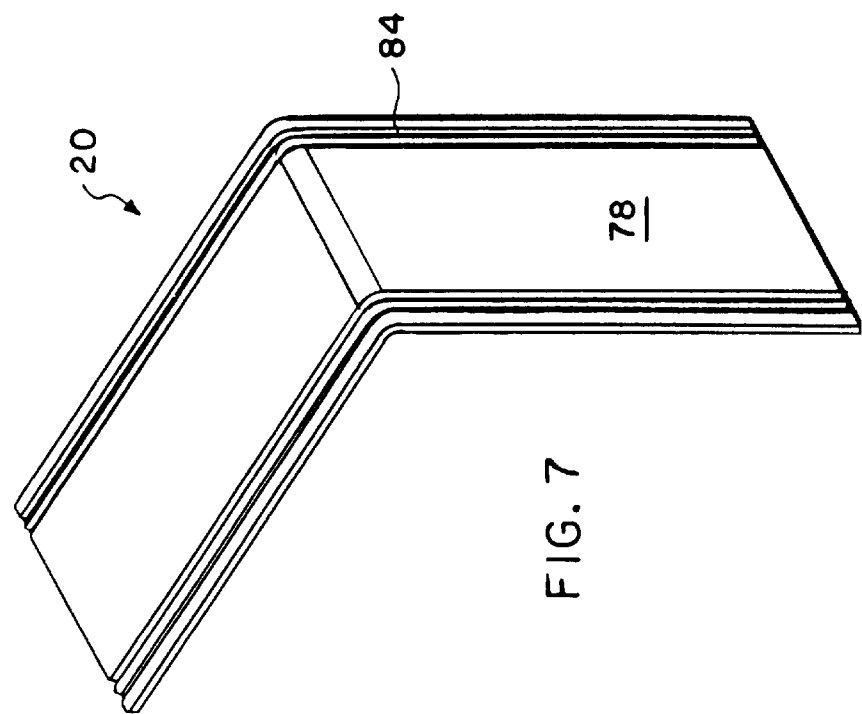

APPARATUS FOR MOUNTING OBJECTS, INCLUDING TENSION MEMBER

RELATED APPLICATIONS

This application is a continuation-in-part of U.S. application Ser. No. 08/579,868, filed on Dec. 28, 1995 now U.S. Pat. No. 5,927,668, the content of which is incorporated herein by reference.

FIELD AND BACKGROUND OF THE INVENTION

This invention relates to apparatus and devices for mounting objects. Particularly, the invention is directed towards such mounting apparatus when used in a residential, industrial or commercial application for the purpose of mounting objects such as television sets, computer monitors, speakers, cameras, VCRs and other types of electronic equipment. However, it is to be noted that the apparatus for mounting objects which forms the subject of this invention is not confined for use with the objects mentioned above.

In order to take advantage of limited space availability, special acoustic requirements, or design efficiency, it is useful to provide mounting systems to permit various objects to be placed in a convenient location. Thus, in conventional residential "media centers", computer monitors and television sets are best placed in certain locations, while, for example, speakers may be placed apart, and connected to walls and ceilings for maximum acoustic effect and space-saving efficiency. The inventor also addresses multiple speaker "home theater" residential audio/visual systems.

The present invention provides an apparatus and system for mounting objects of various types, to permit optimal utilization of space availibility, adjustability of the object's optimal viewing and/or listening angle, and otherwise achieve aesthetic and design effects which may be tailored to the user's needs.

SUMMARY OF THE INVENTION

According to one aspect of the invention, there is provided an apparatus for mounting an object, the apparatus comprising: an elongated framing member having a body portion and a depending side wall extending down each side of the body portion; and at least one continuous slot in the framing member.

Preferably, the body portion is arcuate, and has an inner and outer surface, and the framing member has a pair of slots, each slot being located near a depending side wall of the framing member.

The apparatus may further comprise a continuous flange running down the length of the framing member, the flange being substantially parallel to the body portion and defining a continuous groove between the flange and the body portion. The continuous groove may have a widened base portion, i.e., be essentially T-shaped in cross-section.

Preferably, the slot is T-shaped, and comprises a narrower entry channel from an outer surface of the body portion, and a wider base channel in communication with the entry channel. The T-shaped slot may be defined by the body portion, side wall and a slot wall, the slot wall extending between the body portion and the side wall.

The apparatus may further comprise at least one connecting piece or member for connecting two framing pieces to each other in a desired orientation The connecting piece conveniently comprises a first portion and a second portion, each of the first and second portions having a lateral tongue on each side thereof, the lateral tongue of the first portion being received in the continuous grooves of a first framing piece, and the lateral tongue of the second portion being received in the continuous grooves a second framing piece. The first and second portions of the connecting piece may be located at an angle relative to each other so as to provide a predetermined angle between the first and second framing pieces. Preferably, the connecting piece is corrugated in cross-section so as to provide at least a continuous trough along the length thereof adjacent the lateral tongues.

The apparatus may further comprise an intermediate piece located between the framing member and the object, the intermediate piece having an inner and outer surface wherein the inner surface incorporates a material of a high coefficient of friction. The intermediate piece may be a cornerpiece having first and second sections which are substantially at right angles to each other.

The apparatus may further comprise a corner cover, the corner cover being adapted to cover the connecting member and at least ends of adjacent framing members held together by the connecting member. The corner cover may comprise a body section and depending side wall sections, the depending side wall section including a plurality of tab members for facilitating a snap-fit connection of the corner cover with one or more framing members.

Preferably, the apparatus further comprises at least one cable, the cable extending through the continuous slot of the framing members and the connecting pieces, the cable being tightened by a tensioning apparatus about a frame defined by framing members and connecting pieces and holding the framing members and connecting pieces firmly in place. Preferably, the tensioning apparatus includes compression springs that permit minor elongation of the cable when in the fixed position.

Another aspect of the present invention is a particular manner by which the cable member may be tightened and held in place about the frame. Specifically, the cable is preferably passed through the continuous slot of each framing member, thereby passing fully around the frame. The ends of the cable are then preferably secured within a tensioner. The tensioner is suspended in place in a tensioner hole in one of the framing members. In particular, one end of the cable is preferably passed through two holes on one end of the tensioner and held in place therein by a number of threaded fasteners. The two-hole multiple fastener design provides for a more securely attached cable in the tensioner. The second end of the cable is preferably passed through another hole on an opposite end of the tensioner and held in place by a spring assembly. To ensure that the second end of the cable is secured on the spring assembly, two cable ferrules are preferably clamped on the second end of the cable. The spring assembly is preferably adjustable to pull or release the second end of the cable, thereby tightening or releasing the cable from around the frame. A spring in the spring assembly permits constant tension on the cable to be maintained through a cable adjustment range. This feature ensures that proper cable tension is maintained around the frame even if parts of the apparatus (e.g., the cable, the framing members, etc.) should flex or shift over time. To permit both ends of the cable to pass from the tensioner to the grooves in the framing members, through holes are preferably provided in the walls of the grooves through which the cable may pass. Multiple cables having the same features and attached elements as described above are preferably used on the frame to provide additional security in the event that a cable loosens or fails.

According to another aspect of the invention, there is provided a mounting system for mounting an object, the system comprising: a plurality of elongated framing members each having a body portion and depending side walls, with at least one continuous slot running along the length of the framing member, the framing member having an inwardly directed and continuous flange running along the length thereof, the flange and the body portion of the framing member defining a groove; a plurality of connecting pieces or members for connecting adjacent framing members, the connecting pieces each having a first and second portion and lateral tongues on each of the first and second portions, the connecting pieces being at least partially corrugated in cross-section and defining at least a pair of troughs each adjacent a lateral tongue, the lateral tongues of the connecting piece being received within the grooves of adjacent framing members so as to connect adjacent framing members at predetermined orientations; a plurality of cornerpieces each having a first and second section at substantially right angles to each other, the cornerpiece having an inner and an outer surface with a plastic material of high coefficient of friction located at least partially over the inner surface, each corner piece being located, in use, with its outer surface adjacent a corner connection between adjacent framing members and its inner surface with the material of high coefficient of friction thereon adapted, in use, to engage the object to be mounted; and a corner cover for connection to adjacent framing members to cover the join and any exposed connecting piece; wherein the framing members and connecting pieces are slidably connected relative to each other so as to form an adjustable frame of desired shape and configuration, the mounting system further comprising at least one cable extending through the framing member and connecting pieces so as to securely hold the framing members and connecting pieces securely and firmly relative to each other, the cable being located in the continuous slot of the framing members and in a trough defined in the connecting pieces, the slot of the framing members being continuous and in registry with a trough in the joining connecting pieces.

DESCRIPTION OF THE DRAWINGS

FIG. 7 is a perspective inside view of a corner piece of the mounting system of the invention;

FIG. 8 is a perspective outside view of a corner piece of the mounting system of the invention;

DETAILED DESCRIPTION OF THE PREFERRED EMBODIMENTS

Figure 1:
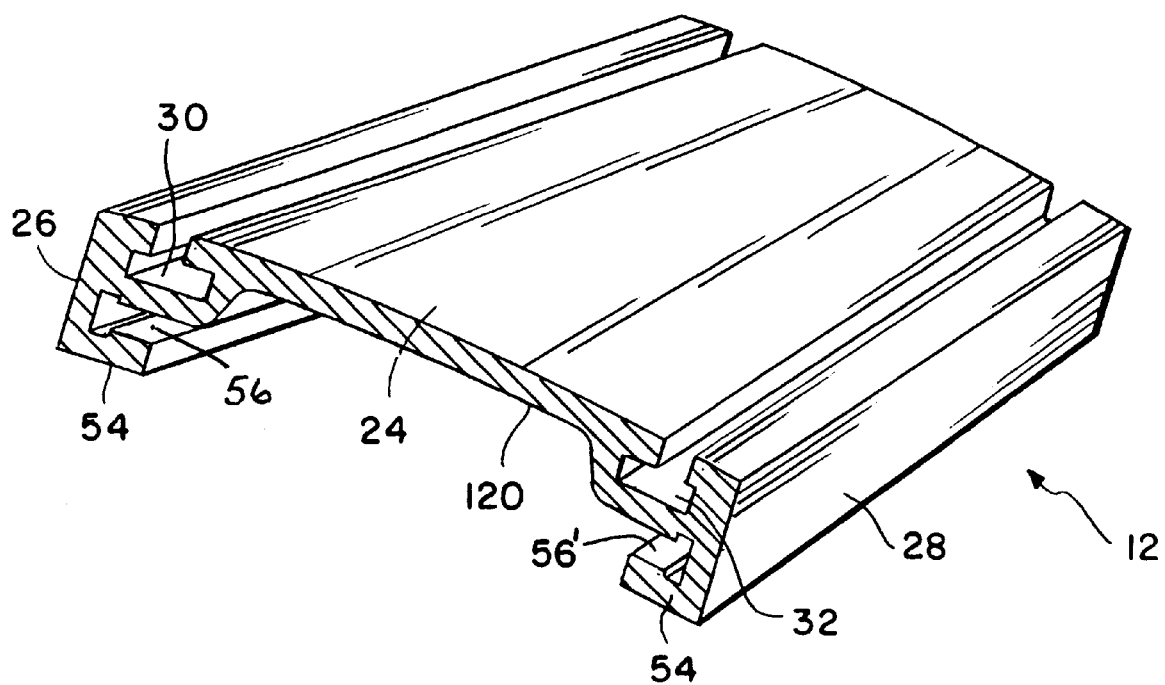
FIG. 1 is a perspective view of a framing member forming part of the mounting apparatus of the invention.

As will be described below with full reference to the attached drawings, the present invention relates to an apparatus for mounting objects, as well as a mounting system. Generally, the apparatus for mounting objects comprises a framing member 12, best illustrated in FIGS. 1 and 2 of the drawings. The mounting system includes a mounting frame 14, the mounting frame 14 including at least two framing members 12, joined together by a connecting piece or member 16, best shown in FIGS. 5, 6, 16a and 16b, a cable 18, a corner piece 20, best shown in FIG. 7 and preferably a corner cover 22, best shown in FIGS. 9 and 10.

Figure 2:
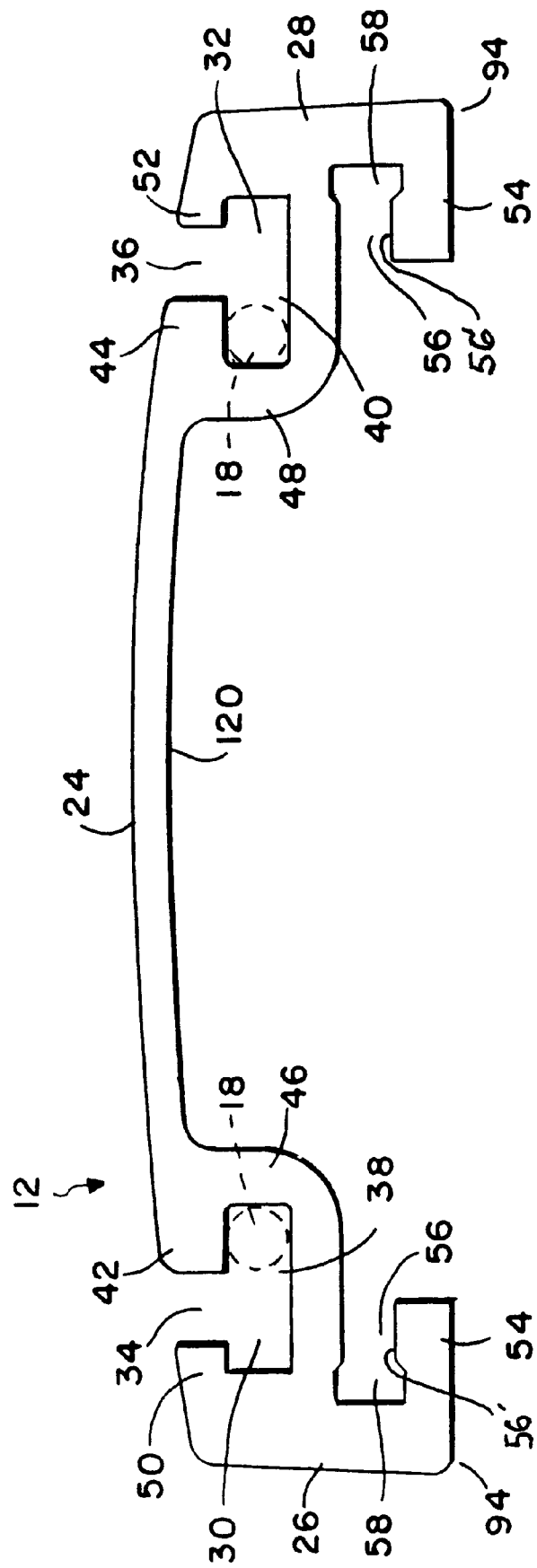
FIG. 2 is end view of the framing member of FIG. 1.
Figure 3:
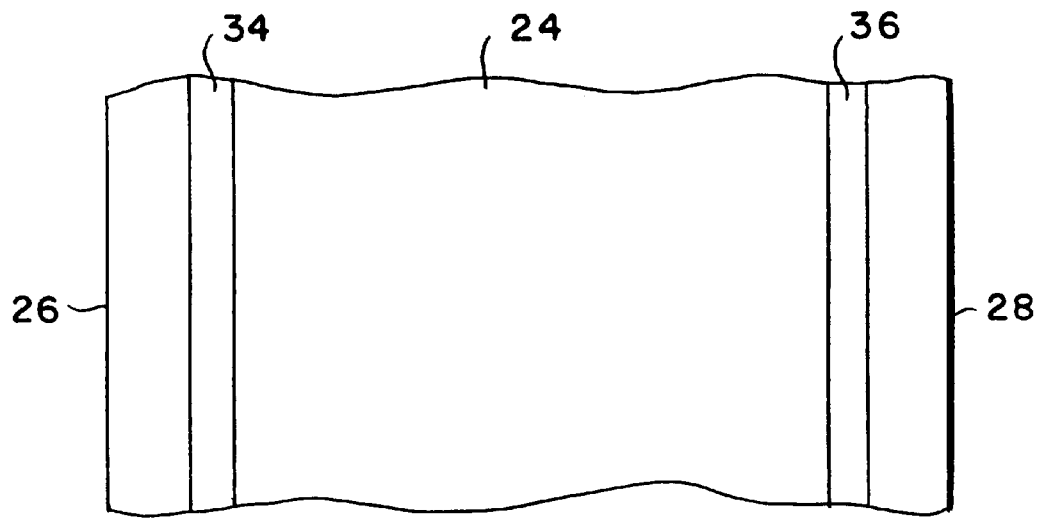
FIG. 3 is a plan view of the framing member shown in FIG. 1.
Figure 4:
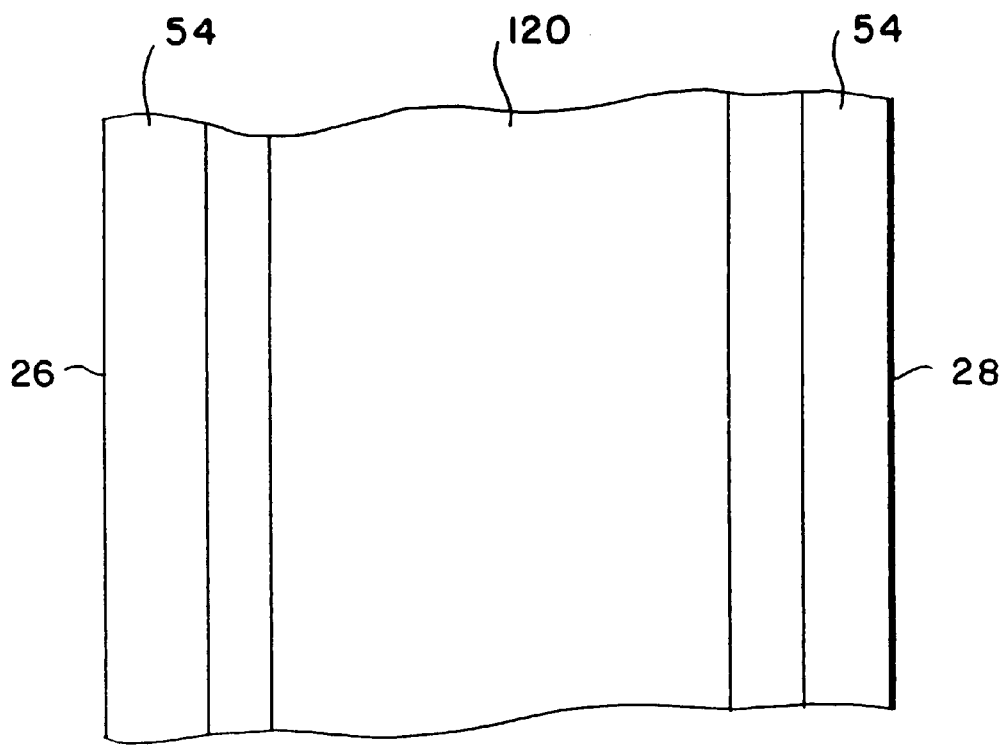
FIG. 4 is a bottom view of the framing member shown in FIG. 1.
Figure 5:
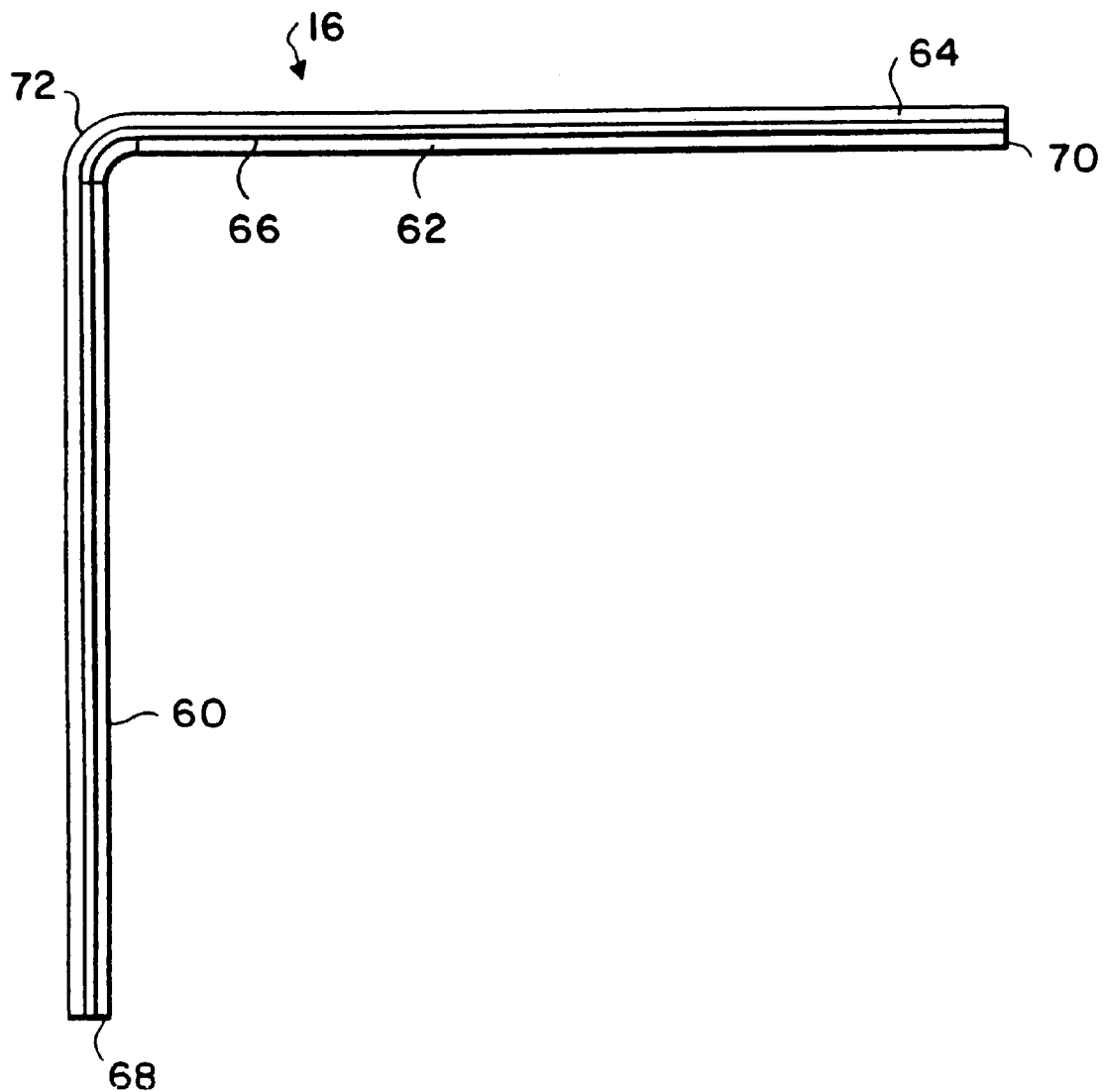
FIG. 5 is a side view of a connecting piece or member used to connect framing members as shown in FIG. 1.

With particular reference to FIGS. 1–3, there is shown a framing member 12 having a body portion 24, and two depending side walls 26 and 28. The body portion 24 is slightly convex.

At each end of the body portion 24 there is located a continuous T-shaped slot 30 and 32, each slot having an entry channel 34 and 36 which leads into the base slot 38 and 40. Each T-shaped slot 32 is therefore defined by a body portion projection 42 and 44, a slot wall 46 and 48, and a part of the side wall 26 and 28, each of the side walls having a side wall projection 50 and 52. The slot walls 46 and 48 recess inwardly towards the center making the T-shaped slot asymmetrical, thus accommodating clearance to recess, out-of-view, cable 18.

Each side wall 26, 28 further comprises an inwardly extending flange 54 which, with the remainder of the side wall 28 and the slot wall 48 defines a groove 56 which is continuous and runs down the entire the length of the framing member 12. The groove 56 has a widened end 58 at the closed end thereof.

As will be described more fully below, a plurality of framing members 12 may be connected to each other so as to define a frame which is adjustable in size, and may assume just about any shape or configuration which may be necessary depending upon the object which the mounting frame 14 is intended to support. Any two adjacent framing members 12 may be connected together by a connecting piece or member 16, best shown in FIGS. 5, 6, 16a and 16b of the drawings. The connecting piece or member 16 shown in FIG. 5 has a first portion 60 and a second portion 62, the first and second portions being at substantially right angles to each other. However, it will be appreciated that the connecting piece or member 16 may have first and second portions which are other than at right angles to each other, depending on the shape of the frame that is to be constructed. Furthermore, the connecting member 16 may simply comprise a substantially plane or straight piece; in other words, such a connecting member has the first and second portions at 180° to each other. In this latter instance, the connecting member 16 will join a pair of adjacent framing members 12 where the framing members are intended to be continuous, and not to define an angle therebetween.

The connecting piece 16 has a defined width for a particular framing member 12, and comprises a tongue 64 at each end thereof. The tongue 64 at each end of the connecting member 16 is adapted to be received in the groove 56 of the framing member 12. Thus, the connecting piece will be sufficiently wide so that it extends at least into the grooves 56 of the framing member 12 but would not be wider than the distance between the side walls 26 and 28 of the framing member.

Between the tongues, the connecting member is comprised of a series of corrugations 66, which impart additional strength to the connecting member, and limit the amount by which the connecting member may bend or give when under a load. Corrugations 66 are shown in FIGS. 5, 6, 15, and 16*b* to illustrate an embodiment of the preferred invention having connecting members 16 with increased strength (i.e., with corrugations 66). However, due to ease and cost of manufacture, the preferred embodiment of connecting member 16 is shown in FIG. 16*a*, and has corner corrugations 67 (rather than corrugations 66 running the entire length of connecting members 16). Corner corrugations 67 receive cables 250 which run across connecting members as described in more detail below.

The first portion 60 of the connecting member 16 has a first end 68, while the second portion 62 of the connecting member 16 has a second end 70. When connecting the connecting member 16 to a framing member 12, the first end 68 is inserted into the grooves 56 and space extending therebetween of the framing member 12. Since the grooves 56 are continuous, the first portion 60 of the connecting piece 16 slides down along the grooves 56, and is able to do so at least until the bend 72 in the connecting member 16. As will be described more fully below, a mounting frame 14 constructed between the framing members 12 and connecting members 16 joining such framing members 12 is variable in size, and the extent to which the first and second portions 60 and 62 of the connecting members 16 extend longitudinally between the continuous grooves 56 of the framing member 12 will in large part depend upon the size of the mounting frame 14 to be constructed, which is in turn dependent on the article or object which the mounting frame 14 is intended to support.

From the above description, it will be appreciated that a plurality of framing members 12, interconnected by connecting members 16 as described above, gives rise to a mounting frame 14 which may be of any desired size or configuration.

In FIGS. 7 and 8, there is shown a cornerpiece 20 comprising a pair of flat surfaces 74 and 76 at substantially right angles to each other. Each flat surface 74 and 76 has an outer side 78, best shown in FIG. 7, and an inner side 80 which can be seen in FIG. 8.

On the inner side 80 of each of the flat surfaces 74 and 76 there is provided a flat hybrid synthetic/rubber or rubber-like material 82 which typically has a very high coefficient of friction. A suitable material is available under the trade name Santoprene (among others). The outer side 78 of the cornerpiece has running therealong a series of rib-like projections 84 extending from one end of the flat surface 74 to the opposite end of the flat surface 76.

In use, as will be described further below, the cornerpiece 20 is intended to be located between the pair of adjacently connected framing members 12 and the object or article which is being mounted. The outer side 78 is, at least along some of its surface area, applied to a pair of adjacent framing members 12, while the inner side 80, and particularly the rubber-like material 82 thereof, is in contact with the object or article to be mounted. As the mounting frame 14 is tightened, to be discussed further below, the cornerpiece 20 becomes firmly wedged and compressed between the mounting frame 14 and the object to be assembled. The rubber-like material 82, with the high coefficient of friction, prevents slipping or sliding of the article relative to the cornerpiece 20, especially when the cornerpiece 20 is pushed against the object or article with some force. On the outer side 78 of the cornerpiece 20, the rib-like projections 84 facilitate a firm connection between the cornerpiece 20 and adjacent framing members (12) to further ensure that no slipping takes place.

Figures 9, 10:
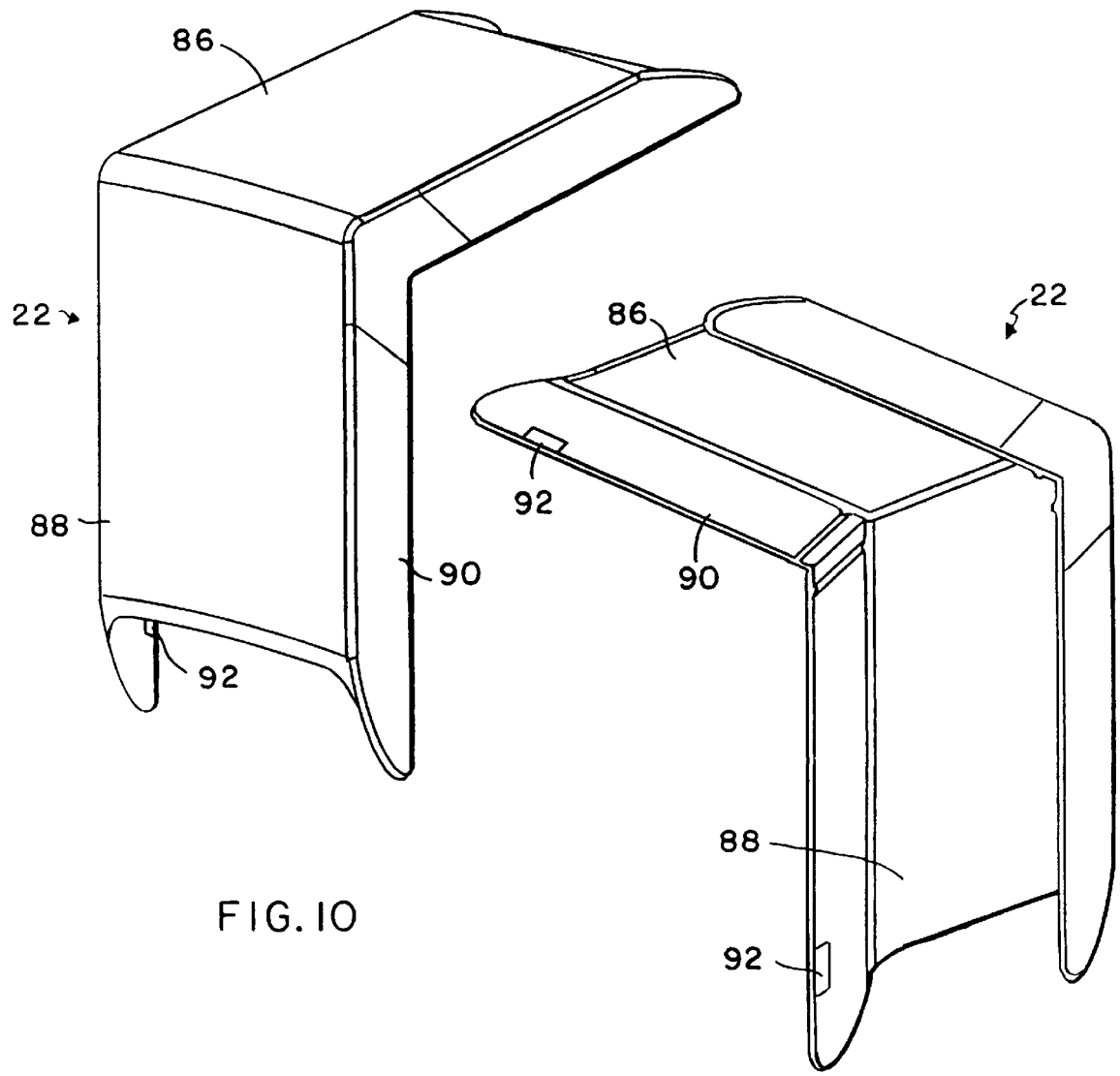
FIG. 9 is a perspective view of the outer side of a corner cover of the mounting system of the invention.
FIG. 10 is a perspective view of the inner side of a corner cover shown in FIG. 9.

With reference to FIGS. 9 and 10, there is shown a corner cover 22 which, in the fully assembled mounting frame 14, essentially has an aesthetic or design function, and covers up the joined ends of the framing member 12 and the cornerpiece 20. The corner cover 22 has a pair of first and second walls 86 and 88 respectively, each of the walls 86 and 88 having a depending side wall 90. At appropriate locations on these side walls 90, a number of tabs 92 are provided so that the corner cover 22 can be attached in a slide-on and snap-fit fashion to the framing members 12. The tabs 92 are located so as to snap behind side walls 26 and 28 at tab-connecting point 94 shown, for example, in FIG. 2 of the drawings. While the tabs 92 constitute a secure fit, it is to be noted that they can also be removed since the cover corner 22 is generally comprised of a plastic material and can be sufficiently bent to remove the corner cover 22 should access or disassembly become necessary.

Figure 15:
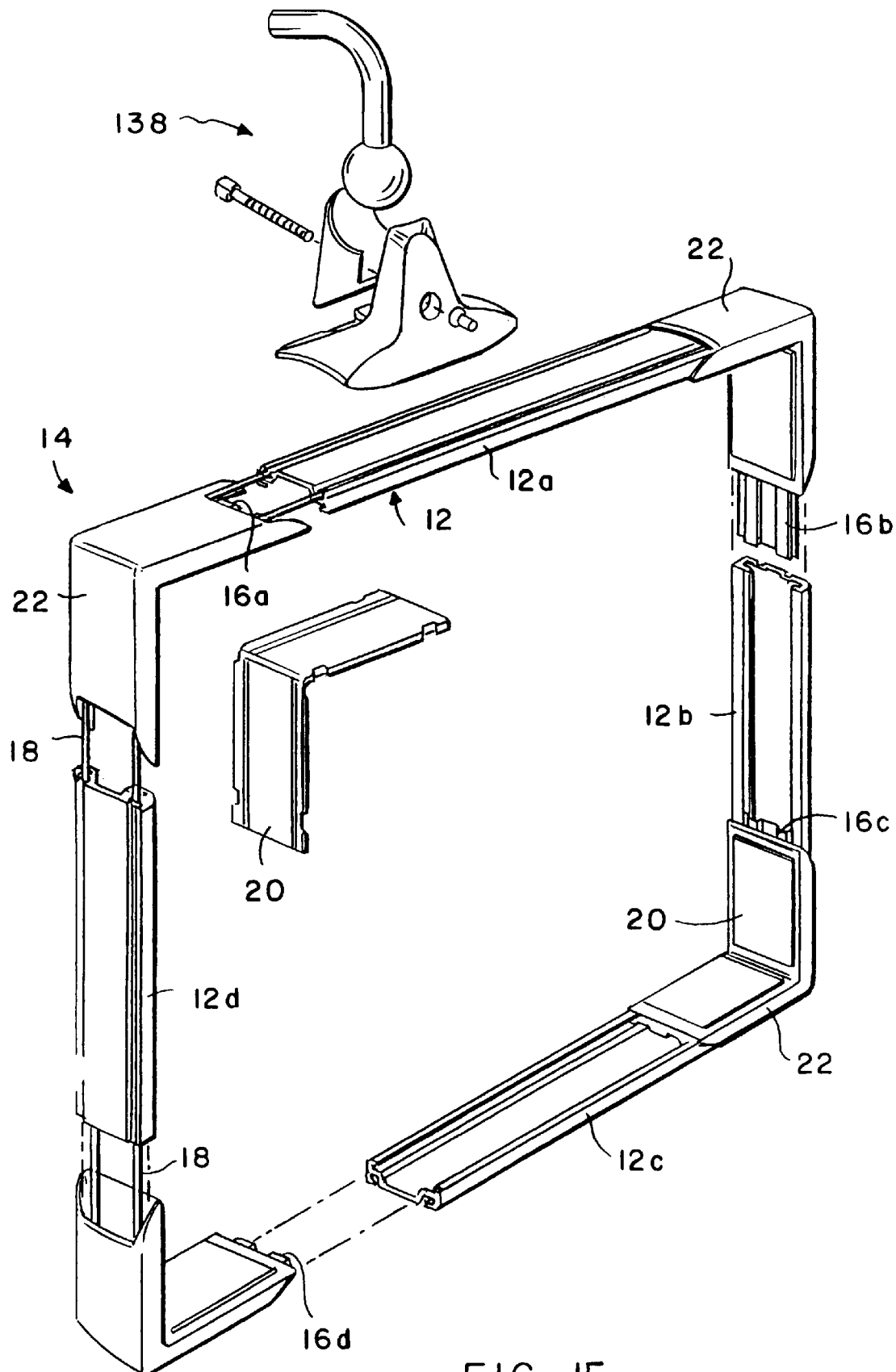
FIG. 15 is a perspective view, partially exploded, of a mounting system of the invention.
Figure 16A:
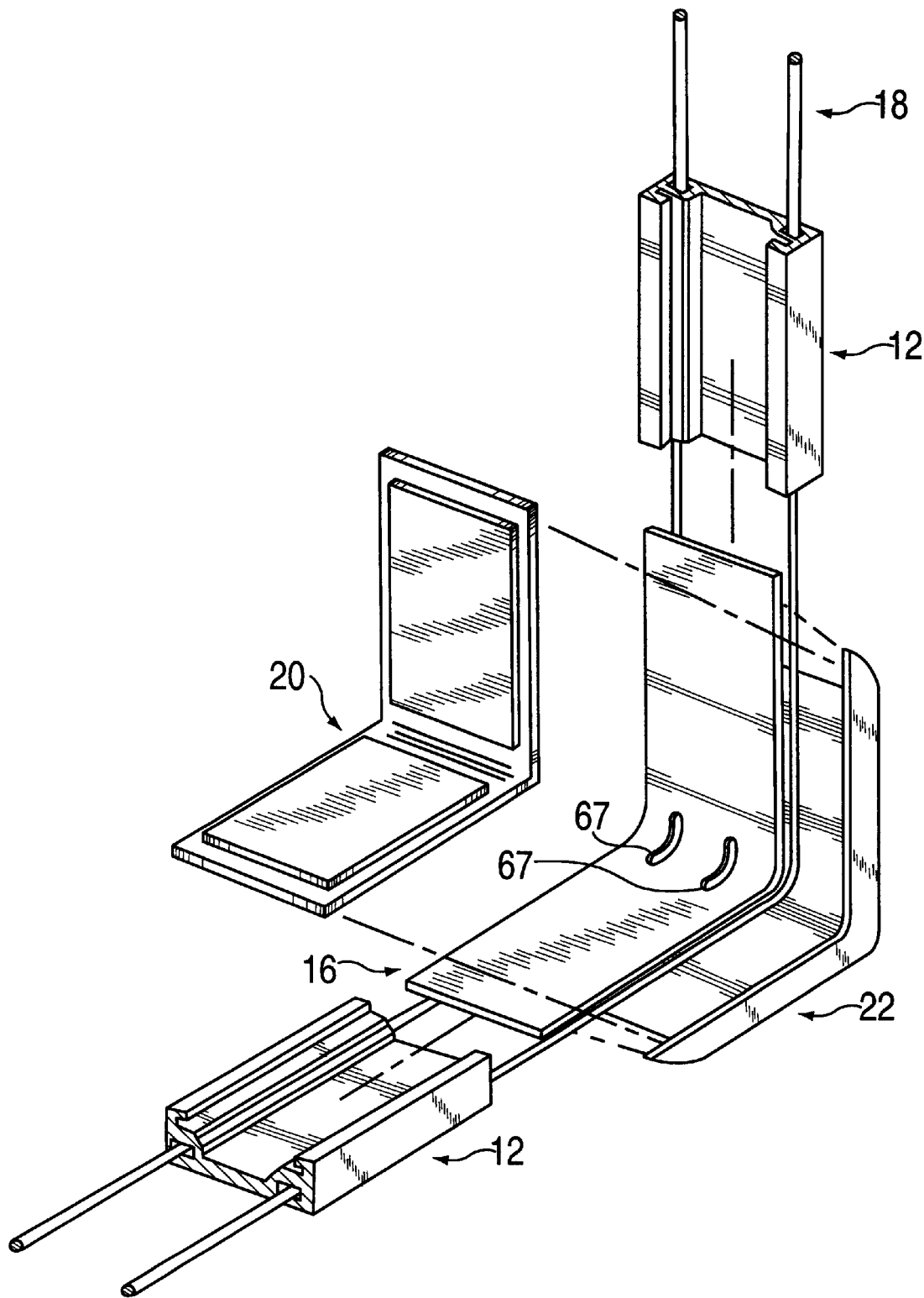
FIG. 16a is a detail of the corner arrangement of the mounting system shown in FIG. 15 using the preferred connecting piece or member.

The various components of the system of the present invention can be assembled to form a mounting frame 14 generally shown in FIG. 15 of the drawings. With reference to FIG. 15, four framing members 12*a*, 12*b*, 12*c* and 12*d* are arranged with respect to each other so as to form a rectangle. In this particular instance, the desired size of the rectangle would be used to hold a monitor for a computer or a television set. Of course, the various framing members 12 can be arranged to form any desired shape or configuration, including an annular shape and configuration according to the article to be mounted.

With the framing members 12*a*, 12*b*, 12*c* and 12*d* in a substantially rectangular form, four connecting pieces or members 16*a*, 16*b*, 16*c* and 16*d* are used to connect the framing members 12*a*–12*d*. Thus, connecting piece 16*a* connects at right angles to each other the framing members 12*a* and 12*d*; connecting piece 16*d* connects the framing members 12*d* and 12*c* together at substantially right angles to each other; connecting piece 16*c* connects together mounting members 12*c* and 12*b* at substantially right angles to each other; and connecting piece 16*b* connects together the framing members 12*a* and 12*b* at substantially right angle to each other. It will be appreciated that the connecting members 16*a*–16*d* are capable of sliding movement within the continuous grooves 56 of their associated framing members 12*a*–12*d*, so that, at least at this stage, there is some flexibility with respect to the size of the rectangle which the various framing members 12a–12d and connecting members 16a–16d may define. Furthermore, the extent of the flexibility can be varied according to the lengths of the first and second portions 60 and 62 of the connecting members 16. The longer the first and second portions 61 and 62 are, the more such first and second portions 60 and 62 may extend outside the track defined by the grooves 56 on the framing member 12, and the larger the rectangle defined by the various components may be. Range of movement may be defined and limited aesthetically by the length of the walls 86 and 88 of the corner cover. However the framing system would still remain functionally operative if the connecting member end became visible.

In order to hold the framing members 12a–12d and the connecting members 16a–16d in position, a cable 18 extends through each of the frame members 12a–12d and adjacent each of the connecting members 16a–16d. In this regard, the slot base 38 and 40 of the continuous T-shaped slots 30 and 32 are adapted to receive the cable 18. Thus, the cable is inserted into the T-shaped slot through the entry channels 34 and 36, and thereafter moved into the inner portion of the base slots 38 and 40 respectively. With reference to FIG. 2, the position of the cable 18 is shown in phantom lines in the base slots 38 and 40 of the T-shaped slots 30 and 32.

Figure 6:
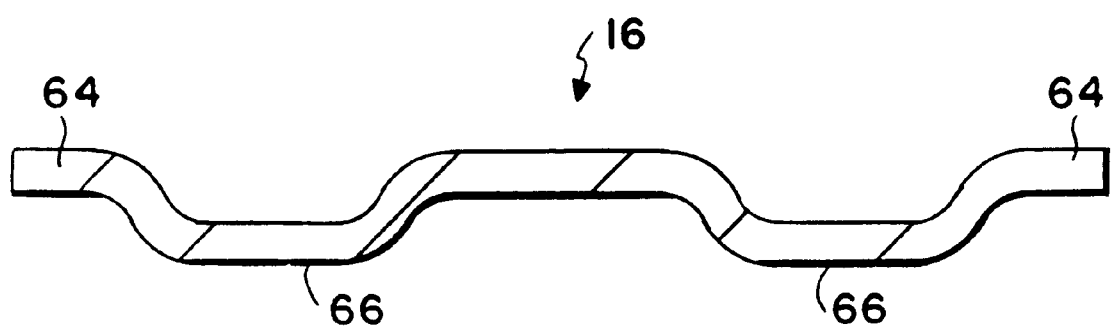
FIG. 6 is an end view of the connecting piece or member shown in FIG. 5.
Figure 16B:
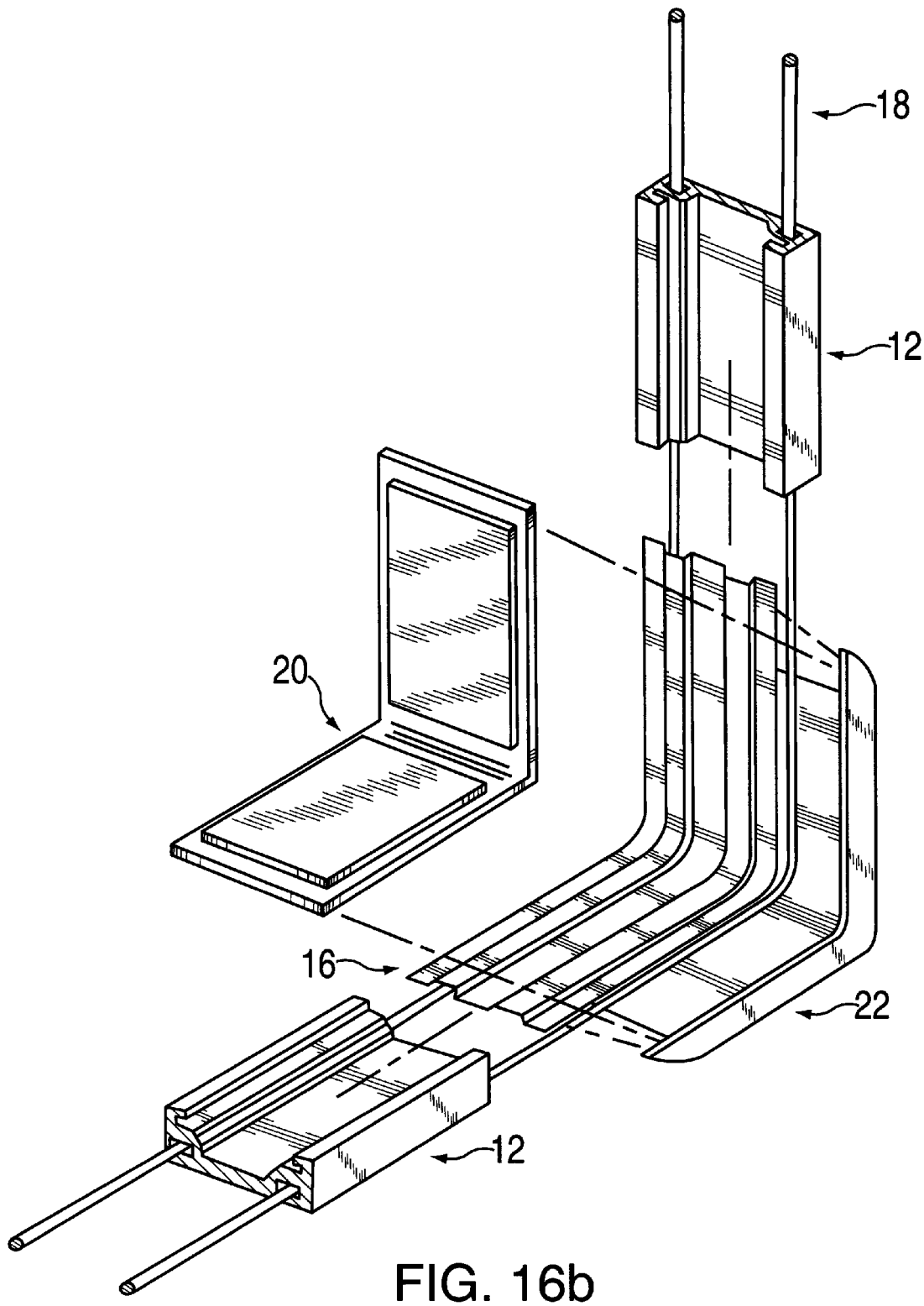
FIG. 16b is a detail of the corner arrangement of the mounting system shown in FIG. 15 using another embodiment of the connecting piece or member.

The cable 18 extends through the base slot 38 and 40 of the T-shaped slots 30 and 32 of each of the framing members 12a–12d, and then passes over the outer side of each connecting piece 16a–16d. It is prevented from any substantial movement as it passes over each connecting piece 16a–16d by virtue of corner corrugations 67 (see FIG. 16a) or corrugations 66 (see FIGS. 6 and 16b) (depending upon which type of connecting piece 16 is used). With reference to FIGS. 6, 16a, and 16b, it will be seen that the corner corrugations 67 and corrugations 66 provide two troughs, one on each side of the connecting piece 16, and each trough is designed to receive the cable 18. The trough offers a path for the cable 18 which continues off from the base slots 38 and 40. The trough also serves to initially position and maintain the position of the cable 18 in the location allocated therefor.

Cable 18 is preferably provided with a cable tensioning apparatus. The use of a cable tensioning apparatus is preferable since it is possible that the cable may, over time, slip or loosen. In addition, it is desirable that there be at least some small amount of "play" in the length of the cable so that the mounting frame 14 can withstand certain movements without compromising the entire system. In addition, it is desirable that the cable have constant tension provided by the force of a compression spring to eliminate the potential for slippage or loosening over time. The compression spring also provides additional travel, essential to facilitate adequate travel during tensioning.

Various cable designs and tensioning systems are possible for achieving the above-stated objectives. Specifically, two preferred embodiment cables and three preferred embodiment tensioning systems of the present invention are described below and illustrated in the accompanying figures (FIGS. 11–14).

Figure 11:
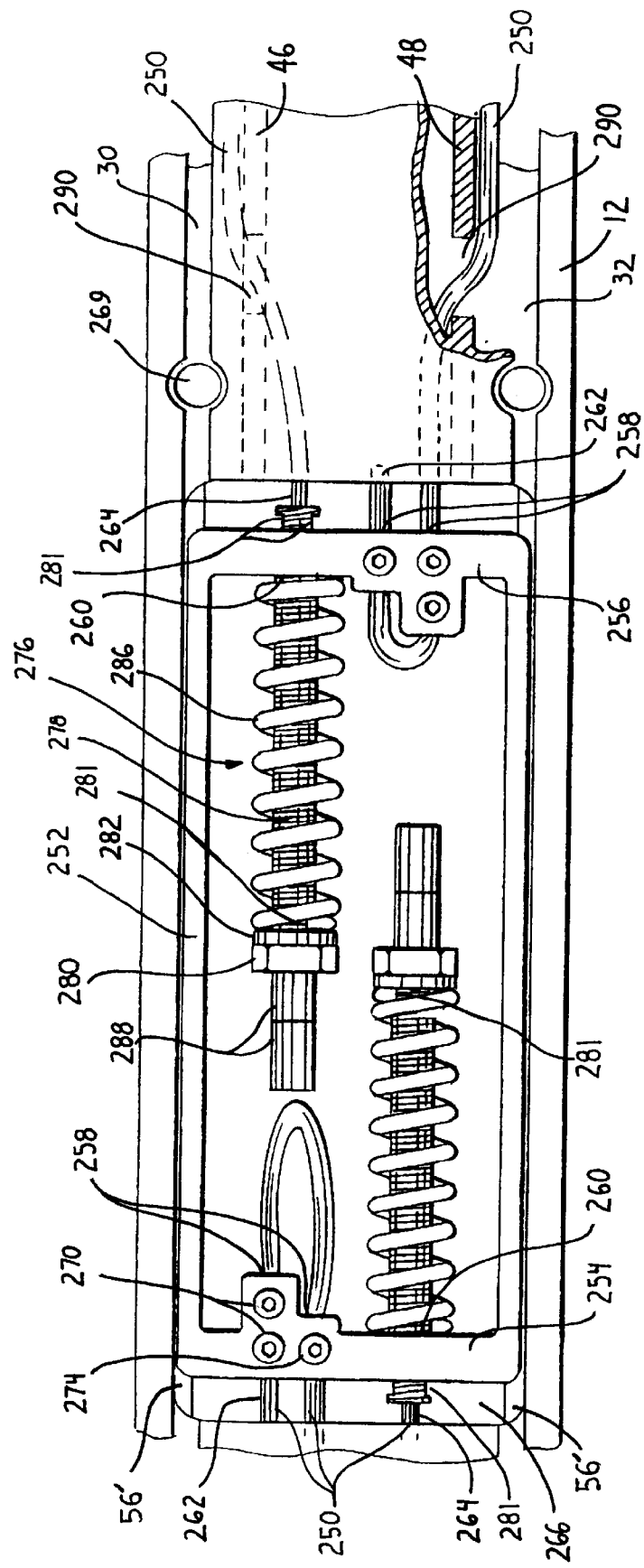
FIG. 11 is a top view, partially sectionalized, of a first preferred embodiment of the cable tensioning apparatus of the mounting system, showing a first preferred cable type installed therein.

In a first preferred embodiment of the cable and tensioning system of the present invention, cable 250 runs through each of framing members 12a–12d and passes over connecting pieces 16a–16d (as described above), and is secured at both ends within tensioner 252 (see FIG. 11). Tensioner 252 preferably has two opposing sides 254, 256 through which pass cable holes 258, 260 which receive opposite ends of cable 262, 264, respectively. Tensioner 252 is preferably housed within a tensioner hole 266 within framing member 12, and is seated upon the wall 56' (see also, FIG. 2) of each continuous groove 56 in framing member 12. Preferably, tensioner 252 is held in place within tensioner hole 266 by being covered by mounting system 138 (see FIG. 15) when the mounting frame is mounted on mounting system 138. To this end, threaded fasteners (not shown) of a conventional mounting system 138 are passed through threaded mounting holes 269 flanking tensioner hole 266 in framing member 12. (Note that in FIG. 11, only two of four mounting holes 269 are shown on one side of tensioner hole 266).

It should be noted that the particular rectangular shapes of tensioner 252 and tensioner hole 266 constitute only one possible configuration of these elements. Tensioner 252 may be of any shape which at least has a body to which cable 250 is attachable (e.g., through cable holes as described in more detail below) and which is held within an appropriately-shaped tensioner hole 266 (preferably matching the shape of the tensioner). For example, the tensioner may simply be a single bar held in place within a tensioner hole and through which all cable holes pass which are necessary for securing both ends of a cable (as described below). Also, the manner in which the various shapes and types of tensioners are seated within tensioner holes may vary considerably, and depend largely upon the shape of the tensioner. Although the tensioner hole location in the preferred embodiment is in the center of a framing member and beneath a conventional mounting system 138, the particular location of a tensioner hole may also vary. In fact, the tensioner hole and tensioner held therein may be located on any framing member 12 of a mounting frame 14, and need not necessarily be located under a conventional mounting system 138.

Tensioner 252 is preferably made from aluminum. However, tensioner 252 may be made of a wide variety of materials offering the strength necessary to hold and secure both ends of cable 250 when fully loaded. Alternative materials include steel, iron, titanium, and other metals, composites, ceramics, plastics, wood, etc.

One end 262 of cable 250 is preferably secured in one tensioner side 254 as follows. Cable 250 is snaked through a pair of adjacent cable holes 258 in tensioner side 254. One of the cable holes 258 has two setscrew holes joined thereto for passing setscrews 270 therethrough. The adjacent cable hole 258 has one setscrew hole joined thereto for passing setscrew 274 therethrough. By tightening setscrews 270, 274 in the setscrew holes with cable 250 installed in cable holes 258, cable end 262 is clamped in place in tensioner side 254. The U-shaped loop made by snaking cable 250 through cable holes 258 (as described above and illustrated in FIG. 11) and securing cable end 262 therein with setscrews in each cable hole 258 provides a reliable manner in which to secure cable end 262 to tensioner 252. Of course, more or fewer setscrews may be used for cable holes 258. Cable 250 may even be passed through only one cable hole and secured therein using one setscrew. However, the use of multiple (i.e. three) setscrews in multiple cable holes is preferred, since such a design provides for additional strength and safety. Additionally, other conventional fasteners and fastening methods may be used to clamp cable 250 to tensioner side 254. For example, cable 250 may be clamped in other manners, welded, tied, or crimped in place, ferrules may be crimped on cable end 262 so that it may not pass out of a cable hole, etc. It should be noted, however, that some securement manners do not provide the advantage of cable releasability realized in the preferred embodiment (setscrews 270, 274 may be loosened to remove cable 250 entirely from tensioner 266).

The opposite end 264 of cable 250 preferably is attached to tensioner 252 by a tension spring assembly 276. Tension spring assembly 276 preferably includes threaded tube 278, nut 280, washer 282, and spring 286. Threaded tube 278 preferably extends within cable hole 260 in tensioner side 256 and is loosely held therein (i.e., may slide therein). Cable end 264 extends fully through threaded tube 278 in cable hole 260 and has one or more (preferably two) ferrules 288 crimped to its terminal end. Two ferrules are preferred (rather than one) to ensure that cable end 264 is firmly secured within tension spring assembly 276. Ferrules 288 prevent cable end 264 from passing through threaded tube 278 not only because ferrules 288 are preferably larger than the inside diameter of threaded tube 278, but also because one of the ferrules 288 abut against nut 280 threaded onto threaded tube 278. Spring 286 preferably surrounds threaded tube 278 and is kept in place on tension spring assembly 276 by abutting washer 282 on one end (which itself abuts nut 280) and tensioner side 256 on another end.

Once mounting frame 14 is secured in place about a mounted object (e.g., a monitor), cable 250 may be tightened by adjusting tension spring assembly 276. Specifically, by turning nut 280, threaded tube 278 is either drawn into or allowed to be pulled out of cable hole 260, depending upon which direction nut 280 is turned. To prevent cable 250 and threaded tube 278 from turning or twisting with nut 280 as nut 280 is adjusted, flats 281 are preferably provided on the ends of threaded tube 278 for a user to hold (by using a wrench, for example) while adjusting nut 280. By using flats 281 to hold threaded tube 278, damage to cable 250 caused by twisting when nut 280 is turned is avoided. By tightening nut 280 to draw tube 278 and cable end 264 further into tensioner 252, cable 250 is tightened around mounting frame 14. Overtightening is prevented by spring 286, which preferably is selected to provide a constant compression force over a wide range of spring compressions. Spring 286 thereby also acts to provide a constant tension force on cable 250 over a range of cable lengths. This feature is particularly valuable when mounting frame parts settle or shift over time, thereby causing slight slack in cable 250. Such slack is picked up by tension spring assembly 276. Conversely, if mounting frame 14 is exposed to shock or if the load on cable 250 increases for some reason, the increased clamping force exerted by mounting frame 14 on a mounted unit is avoided by tension spring assembly 276 releasing a length of cable 250. Since increased clamping force may be potentially damaging to mounted units, this feature acts to protect the mounted unit.

It will be appreciated by those having skill in the art that a number of conventional springs and spring attachment methods may be used as alternatives to the tension spring assembly 276 of the preferred embodiment. For example, rather than using a helical spring, spring 286 may be a leaf spring, coil spring, etc. attached to cable end 264 and to tensioner 252 in a conventional manner. Adjustment of alternative springs are well known to those skilled in the art and are not discussed further herein.

As discussed further below, mounting frame 14 and tensioner 252 are preferably provided with two cables 250 and tension spring assemblies 276. The inclusion of two (or even more) separate cables 250 and tension spring assemblies 276 increases the reliability of mounting frame 14. In particular, if one cable 250 and tension spring assembly 276 fails, other cables 250 and tension spring assemblies 276 act as backup elements to keep a mounted unit safely secured within mounting frame 14.

With reference to FIG. 11, cables 250 preferably pass from cable holes 258, 260 to a position beneath framing member 12. To run cables 250 to their respective positions within slots 30 and 32, cable holes 290 are preferably provided in slot walls 46, 48 of framing member 12.

Figure 12:
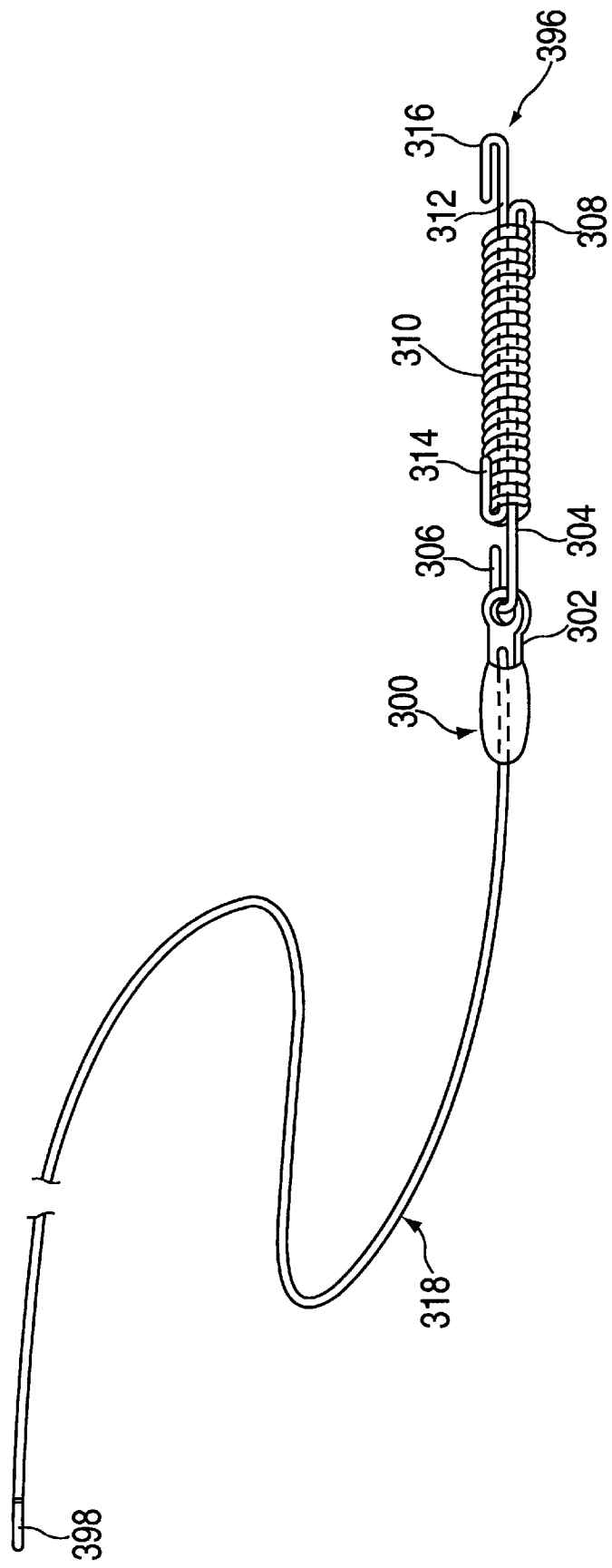
FIG. 12 is a view of a second preferred cable type of the mounting system.

A second embodiment of the cable is shown in FIG. 12. Cable 318 has a first end 396 and a second end 398 which joins to the first end 396 in any suitable matter. Cable 318 is preferably provided with tensioning apparatus 300, which may include a ring clamp 302 near the first end 396 of the cable 318. A first tie 304 with a hook 306 and 308 at each end thereof is provided. The hook 306 engages the ring clamp 302, while the hook 308 extends through a compression spring 310, around which it attaches. A second tie 312, also having a hook 314 and 316 at each end is provided. The hook 314 of the second tie 312 extends through and around the compression spring 310, while the hook 316 on the second tie 312 is available for connection to the second end 398 of the cable 318. Alternatively, the first and second ends 396 and 398 of the cable 318 may be attached in a fixed manner to a part of the mounting frame.

In assembling the mounting frame 14 around an object to be mounted, the framing members 12a–12d and connecting pieces or members 16a–16d are assembled with respect to each other as shown in FIG. 15, and two cables are threaded through the framing members 12a–12d and connecting members 16a–16d as described above. The cable is held loosely, so that the area defined by the mounting frame 14 is slightly larger than the object to be mounted. The tensioning means 252, 300 is intended to incorporate two independently functioning cable assemblies, either one of which will support the object at the maximum rated load, should one cable assembly not operate at any time.

At this time, a cornerpiece 20 is placed at each of the four corners of the object to be mounted. The rubber-like material 82 is permanently affixed to the cornerpiece 20. Each cornerpiece 20, mounted at a corner of the object, will remain in contact therewith and is unlikely to slip because of the high coefficient of friction created by the rubber-like material 82. With each cornerpiece in position, the object and mounting frame 14 are brought into registry with each other so that the mounting frame surrounds the object at those points where the connecting members are located. In this position, the mounting frame 14 is ready to be tightened and secured so that the object is firmly held therein. To this end, the cable is tightened drawing the framing members 12a–12d and connecting members 16a–16d more closely and more tightly together, and bringing compressive pressure on the object through surface contact with the rubber-like material 82 on the cornerpieces 20. When the cable has been sufficiently tightened, the cornerpieces 20 and rubber-like material 82 will be firmly wedged between the object being mounted and the mounting frame 14 defined by the framing members 12a–12d and connecting members 16a–16d. When sufficient tightening has taken place, the cable ends are secured so that further movement of the cable is not permitted. As mentioned above, a minor movement of the cable will be permissible if a spring 286, 310 is used as part of a tensioning means 252, 300, but this movement will be insufficient to permit the amount of expansion necessary to allow the mounted object to fall out of the mounting frame 14. The object, such as a television monitor, therefore now has a mounting frame 14 securely tightened about its perimeter. The mounting frame, when used to mount, for example, a television monitor, is intended to be positioned in line with the television monitor's center of gravity situated in almost all cases at the very front of the television monitor enclosure.

At this point, a corner cover 22 may be placed on and snapped into position at each corner so as to cover the join between the adjacent framing members 12 and to cover the particular connecting piece 16. The corner cover 22 thus provides an appealing appearance and finishes off, from an aesthetic point of view, the mounting frame 14. The corner covers 22 have a snap-fit connection to the frame member 12, with the tabs 92 of the corner cover 22 fitting around the tab connecting point 94 of the framing member 12. The corner cover 22 can be easily removed, being made of plastic material, for appropriate adjustment or disassembly of the mounting frame 14 as necessary. The entire mounting frame is intended to present a low, unobtrusive profile in relation to the object or device to be mounted.

The framing members 12 and connecting members 16 are generally comprised of aluminum or steel, particularly where the object to be mounted is heavy. For smaller, lightweight objects, these components may be comprised of strong plastic such as polyurethane and/or polycarbonates.

Figure 13:
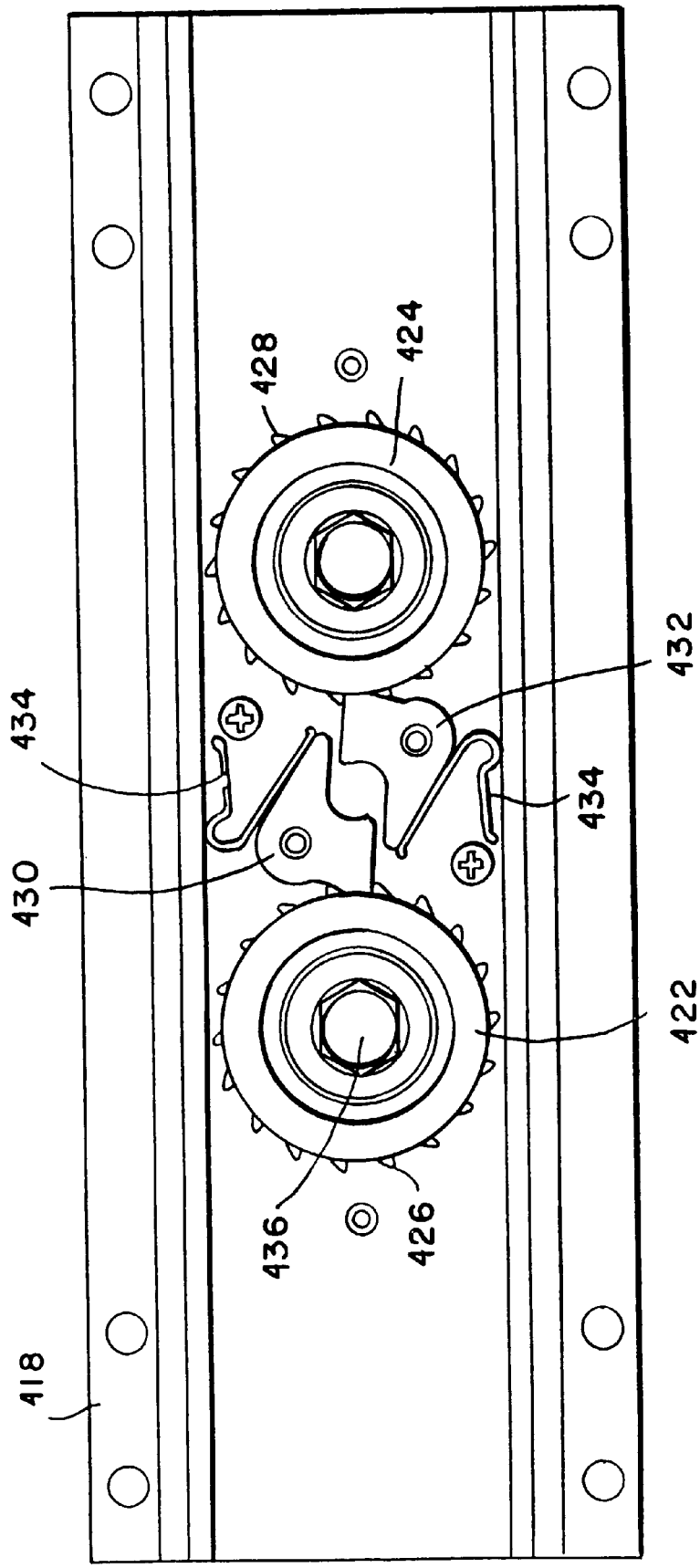
FIG. 13 is a plan view of a second embodiment of a cable tensioning apparatus of the mounting system of the invention.

FIG. 13 shows a second preferred embodiment of a cable tensioning apparatus. A base plate 418 is provided which is adapted to lie below the body portion 24 of the framing member 12. Thus, the base plate 418 will typically abut or be adjacent to the inner surface 120 of the body portion 24. On the base plate 418 there are located two cable wheels 422 and 424 with one cable end winding around the cable wheel 424 and with the other cable end winding around the other cable wheel 422. Each cable wheel 422 and 424 incorporates a ratchet gear wheel 426 and 428 and a corresponding pawl 430 and 432. Associated with each pawl 430 and 432 is a pawl spring 434.

Typically, the body portion 24 of the framing member 12 will have holes therein corresponding to the position of the hub 436 of each wheel 422 and 424, and with the use of appropriate tools, extending through the hole, the cable wheels 422 and 424 can be turned to effect the necessary tightening and tensioning of the cable to securely hold the mounting frame 14 in the desired position.

Figure 14:
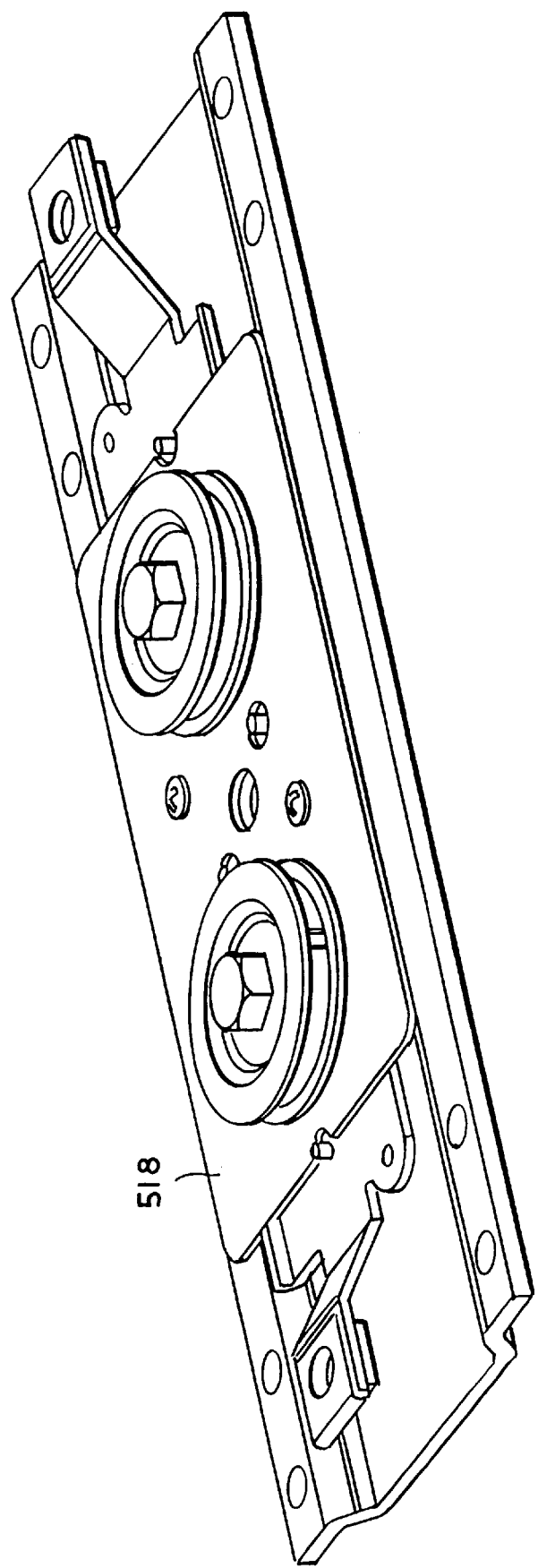
FIG. 14 is a third embodiment of the cable tensioning apparatus of the mounting system of the invention.

FIG. 14 shows a third embodiment of a cable tensioning apparatus. In this embodiment, conventional cable wheels can be tightened to effect the necessary tension in the cable, and the wheels thereafter bolted securely to the base plate 518.

Figure 17:
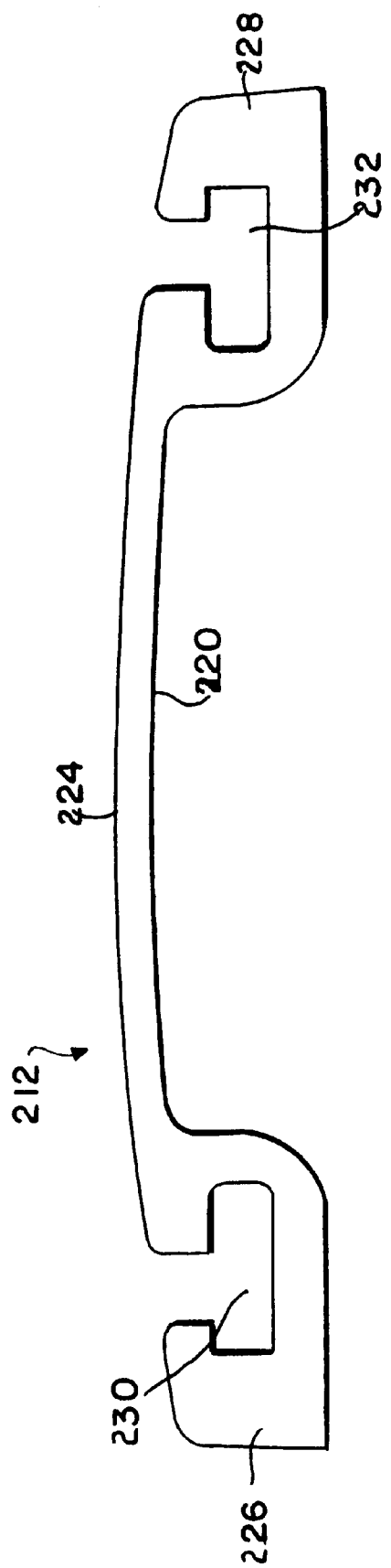
FIG. 17 shows a second embodiment of a framing member of the invention.
Figure 18A:
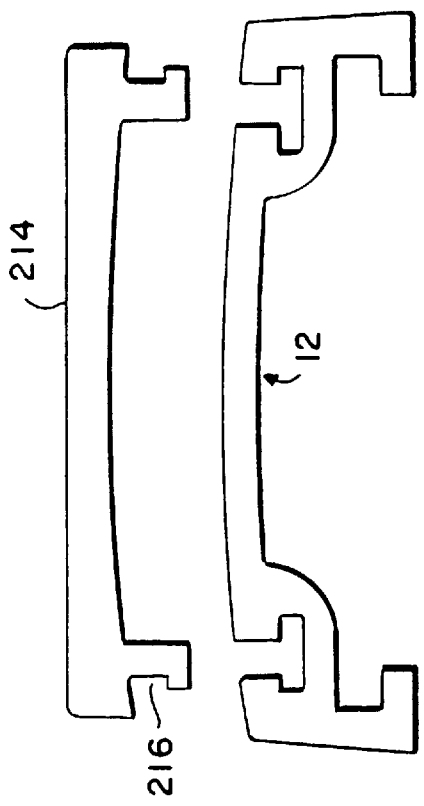
FIGS. 18a and 18b show the framing member of FIG. 1 in conjunction with an adapter plate for use therewith.
Figure 18B:
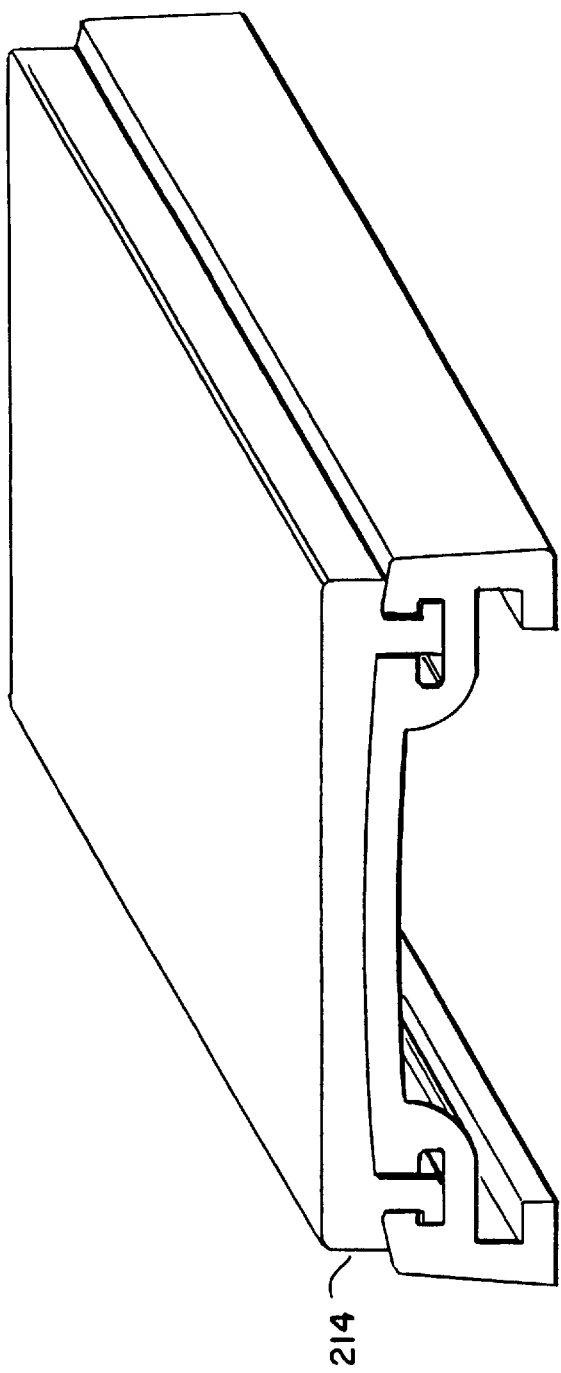

Turning now to FIG. 17, there is shown a second embodiment of a framing member 212, which is in all material aspects identical to the framing member 12 shown in FIGS. 1–3, except that the side walls 226 and 228 are shorter, and no flange 54 is provided. There will, of course, be no groove 56. A mounting member of the type shown in FIG. 17 may be used for a different mounting purpose. For example, an extended extrusion of the framing member 212 may be bolted to a wall, and an adapter plate 214 is structured so as to be received and slide within the T-shaped slots 230 and 232. Each adapter plate 214, an example of which is shown in FIGS. 18a and 18b of the drawings, has a pair of L-shaped projections 216 which are spaced and designed to slide freely in the continuous T-shaped slots 230 and 232. Each adapter plate 214 includes a fixing means which may comprise a bolt in a threaded hole. As the bolt is tightened, it will apply pressure to the body portion, thus fixing the adapter plate with respect to the body portion. The adapter plate is then available for use, and, depending on its shape and configuration, will either support or permit to be mounted desired objects.

It may also be noted that the framing member 12 shown in FIGS. 1–3 is also capable of mounting on a wall so that an adapter plate 214 may slide within the T-shaped slots 30 and 32. Indeed, an advantage of mounting a framing member 12 of the type shown in FIGS. 1–3 against a wall is that the mounting pieces may be located behind the body portion, namely, between the body portion and the wall, and therefore not be visible when mounted. An adapter may therefore comprise a plate which slides in and is received in the continuous grooves 56, the plate being mounted to the wall. Once the plate is mounted to the wall, the framing member 12 is located over the plate, and one or more such plates may hold the framing member 12 in position. In such an arrangement, usually only one bolt is required through the body portion of the framing member, as opposed to two or more bolts, which may be visible, which are required when using a framing member 212 of the type shown in FIG. 15. The plate may be integrated as part of a die-cast and cap fitting that both dresses-down the end of framing member 12 and slides into the continuous grooves 56 of the framing member 12.

The apparatus for mounting an object, and the mounting system of the present invention, have a wide variety of applications and uses, as alluded to above. Thus, the framing member 12, in conjunction with connecting members 16 of different angle, can be used to create a frame of just about any size and shape, and therefore be easily adapted to mounting the object desired. As an example, the articles or objects which may be mounted by a system described in the present invention include computer monitors, television sets, cameras, VCRs, speakers, computers, printers, microwave ovens and a host of other electronic equipment. The components of the present invention additionally provide an aesthetically pleasing, low-profile frame which would, from a design point of view, enhance the appearance of a residential media center, home theaters or any other environment in which it is located. The invention has applications not only in residential media centers, home theaters but also with respect to commercial displays in retail outlets, positioning of electronic equipment in theaters, cinemas, broadcast and production facilities and corporate boardrooms and the like.

Once the mounting frame 14 has been properly located around an object, such as a television set, the mounting frame is attached to any suitable and/or conventional mounting system 138, as shown in FIG. 15 of the drawings. With desired mounting systems, which may comprise ball and socket connections or elbow joints, the frame, together with the object therein, can be attached to a wall, ceiling or floor so that its position is exactly as desired.

The system also has certain advantages particularly with respect to television sets and computer monitors. In this regard, the mounting frame 14 can be located about that portion of the object through which the center of gravity passes. When mounted in this way, the object will be relatively well "balanced" within the mounting frame, and therefore unnecessary load due to overbalancing or uncentered mounting can be avoided.

This system also provides a particularly secure connection with the object. The ability to design the frame to exactly fit the object to be mounted, the high coefficient of friction of the material in the cornerpiece 20 which is directly in contact with the object, all coupled with the ability to tension the cable to tighten the entire the mounting frame 14 to suit the circumstances, provide for an extremely secure and stable arrangement. Thus, the object mounted will not easily be displaced from the mounting frame by any unintentional knock or shaking, or any violent motion produced by an earthquake. The use of two fully independent cable systems in the mounting frame is an added safety feature since, if one cable were to become loose or otherwise fail in its ability to keep the mounting frame together, the other cable would still continue to function and essentially hold the mounting frame together.

The system is also exceptionally flexible in that objects mounted can be moved, for example, from one residence to another, without actually dismantling the mounting frame 14 from the object mounted. Rather, the object will remain in the frame, and the entire structure disengaged from the floor, wall or ceiling, so that when moving the system a minimal amount of deconstruction and reassembling is necessary.

The invention is not limited to the precise constructional details illustrated or described above. Thus, the framing member 12 may have a configuration or shape other than that described. For example, the body portion need not be arcuate, the continuous T-shaped slots may be of slightly different shape, with other small constructional changes. Moreover, any suitable means for fastening and/or tensioning the cable may be provided. Additionally, and where appropriate, the cornerpiece 20 may be omitted, or be incorporated into the framing member 12 and/or connecting piece 16 which may have extensions or projections for the purpose of frictionally engaging the object to be mounted.

What is claimed is:

1. A tensioning assembly, for installation about an object, comprising:
    a tension member having opposite ends and a middle portion, wherein both ends and the middle portion substantially completely encircle a location for receiving the object, and;
    a tensioner assembly having a spring;
    wherein, in use, one end of the tension member is secured to the tensioner assembly, the spring is operably connected to an opposite end of the tension member and is biased to tighten the tension member around the object.

2. The tensioning assembly as claimed in claim 1, wherein the tension member is a cable.

3. The tensioning assembly as claimed in claim 1, wherein a first end of the tension member passes through at least two tension member holes formed in the tensioner assembly.

4. The tensioning assembly as claimed in claim 3, further comprising a threaded fastener adjustable to clamp the tension member within one of the at least two tension member holes.

5. The tensioning assembly as claimed in claim 3, further comprising:
    a first threaded fastener adjustable to clamp the tension member within one of the at least two tension member holes; and
    a second and third threaded fastener adjustable to clamp the tension member within another of the at least two tension member holes.

6. The tensioning assembly as claimed in claim 5, wherein the tensioner assembly is rectangular and has two opposing sides, one of each end of the tension member being attach to a corresponding one of the two opposing sides of the tensioner assembly.

7. The tensioning assembly as claimed in claim 1, wherein a first end of the tension member passes through a tension member hole formed in the tensioner assembly.

8. The tensioning assembly as claimed in claim 7, further comprising a threaded fastener adjustable to clamp the tension member within the tension member hole.

9. The tensioning assembly as claimed in claim 8, further comprising one or more additional threaded fasteners adjustable to clamp the tension member within the tension member hole.

10. The tensioning assembly as claimed in claim 8, wherein the tensioner assembly comprises a tension spring assembly attached to a second end of the tension member.

11. The tensioning assembly as claimed in claim 10, wherein the second end of the tension member extends through and is coupled to the tension spring assembly.

12. The tensioning assembly as claimed in claim 11, wherein a terminal part of the second end of the tension member extends beyond the tension spring assembly,
    the tensioning assembly further comprising at least one ferrule secured to the terminal part of the second end of the tension member, the at least one ferrule being sized to prevent the terminal part of the second end of the tension member from being drawn through the tension spring assembly.

13. The tensioning assembly as claimed in claim 12, wherein the tension spring assembly comprises:
    an externally threaded tube through which the second end of the tension member passes;
    a spring surrounding the externally threaded tube; and
    a nut threaded on the externally threaded tube;
    the spring being held on one end by the nut and on another end by a wall of the tensioner assembly.

14. The tensioning assembly as claimed in claim 13, wherein the spring has a spring rate which is substantially constant throughout a range of spring compression in reaction to varying force exerted on the tension member.

15. The tensioning assembly as claimed in claim 13, wherein the tension spring assembly may be adjusted by turning the nut on the externally threaded tube to compress or decompress the spring.

16. The tensioning assembly as claimed in claim 1, further comprising:
    at least one additional tension member having opposite ends, the ends of the tension member being secured to the tensioner assembly such that the at least one additional tension member is capable of being disposed about a location for receiving the object;
    at least one additional spring, each additional spring biased to tighten the tension member around the object.

17. The tensioning assembly as claimed in claim 1, wherein the tensioner assembly comprises a tension spring assembly attached to a first end of the tension member.

18. The tensioning assembly as claimed in claim 17, wherein the first end of the tension member extends through and is coupled to the tension spring assembly.

19. The tensioning assembly as claimed in claim 11, wherein a terminal part of the first end of the tension member extends beyond the tension spring assembly, the tensioner assembly further comprising at least one ferrule secured to the terminal part of the first end of the tension member, the at least one ferrule being sized to prevent the terminal part of the first end of the tension member from being drawn through the tension spring assembly.

20. The tensioning assembly as claimed in claim 19, wherein the tension spring assembly comprises:
    an externally threaded tube through which the first end of the tension member passes;
    a spring surrounding the externally threaded tube; and
    a nut threaded on the externally threaded tube;
    the spring being held on one end by the nut and on another end by a wall of the tensioner assembly.

21. The tensioning assembly as claimed in claim 20, wherein the spring has a spring rate which is substantially constant throughout a range of spring compression in reaction to varying force exerted on the tension member.

22. The tensioning assembly as claimed in claim 20, wherein the tension spring assembly may be adjusted by turning the nut on the externally threaded tube to compress or decompress the spring.

23. An apparatus comprising a frame having walls and a tensioning assembly for securing the frame around an object, the tensioning assembly comprising:

a tensioner assembly disposed in the frame;

a tension member, having opposite ends and a middle portion, wherein both ends and the middle portion substantially completely encircle the frame, and wherein one end of the tension member is secured to the tensioner assembly;

a spring disposed in the tensioner assembly and in use biased to tighten the tension member around the frame.

24. The tensioning assembly as claimed in claim 23, wherein the tension member is a cable.

25. The tensioning assembly as claimed in claim 23, wherein the tension member passes from one side of the frame to another side of the frame through a hole formed in a frame wall.

26. The tensioning assembly as claimed in claim 23, wherein the tension member secures the tensioner assembly to the frame.

27. The tensioning assembly as claimed in claim 26, wherein the tension member is secured in place within a tension member hole formed within the frame.

28. A method of installing a tensioning assembly about an object, comprising:

providing a tensioner;

providing a tension member having opposite ends attached to the tensioner;

providing the tensioner with a tension spring assembly coupled to the tension member;

substantially completely encircling the object with the tension member; and adjusting the tension spring assembly by changing compression of a spring in the tension spring assembly, the compression of the spring controlling tension on the tension member.

29. The method as claimed in claim 28, wherein the tension member is a cable.

30. The method as claimed in claim 28, wherein a first end of the tension member passes through a tension member hole formed in the tensioner.

31. The method as claimed in claim 30, further comprising providing a threaded fastener adjustable to clamp the tension member within the tension member hole.

32. The method as claimed in claim 31, wherein the first end of the tension member passes through a second tension member hole formed in the tensioner, and further comprising the step of providing the tensioning assembly with an additional threaded fastener adjustable to clamp the tension member within the second tension member hole.

33. The method as claimed in claim 31, wherein the tension spring assembly is attached to a second end of the tension member.

34. The method as claimed in claim 33, wherein the second end of the tension member extends through and is coupled to the tension spring assembly.

35. The method as claimed in claim 34, further comprising providing a terminal part of the second end of the tension member extending beyond the tension spring assembly, providing the tensioning assembly with at least one ferrule secured to the terminal part of the second end of the tension member, the at least one ferrule being sized to prevent the terminal part of the second end of the tension member from being drawn through the tension spring assembly.

36. The method as claimed in claim 35, further comprising providing the tension spring assembly with:

an externally threaded tube through which the second end of the tension member passes;

a spring surrounding the externally threaded tube; and a nut threaded on the externally threaded tube;

the spring being held on one end by the nut and on another end by a wall of the tensioner.

37. The method as claimed in claim 36, wherein the spring has a spring rate which is substantially constant throughout a range of spring compression in reaction to varying forces exerted on the tension member.

38. The method as claimed in claim 36, wherein the tension spring assembly is adjusted by turning the nut on the externally threaded tube to compress or decompress the spring.

* * * * *